(12) United States Patent
Zaum et al.

(10) Patent No.: US 10,556,392 B2
(45) Date of Patent: Feb. 11, 2020

(54) APPARATUS FOR SEALING AND INFLATING MOTOR VEHICLE TIRES

(71) Applicant: Continental Reifen Deutschland GmbH, Hannover (DE)

(72) Inventors: Christopher Zaum, Seelze (DE); Rainer Detering, Neustadt am Rbge. (DE)

(73) Assignee: Continental Reifen Deutschland GmbH, Hannover (DE)

( * ) Notice: Subject to any disclaimer, the term of this patent is extended or adjusted under 35 U.S.C. 154(b) by 36 days.

(21) Appl. No.: 15/996,298

(22) Filed: Jun. 1, 2018

(65) Prior Publication Data

US 2018/0272631 A1    Sep. 27, 2018

Related U.S. Application Data

(63) Continuation of application No. PCT/EP2016/071743, filed on Sep. 15, 2016.

(30) Foreign Application Priority Data

Dec. 3, 2015 (DE) .......................... 10 2015 224 147

(51) Int. Cl.
  *B29C 73/16* (2006.01)
  *B60S 5/04* (2006.01)
  *B29L 30/00* (2006.01)

(52) U.S. Cl.
  CPC ............ *B29C 73/166* (2013.01); *B60S 5/046* (2013.01); *B29L 2030/00* (2013.01)

(58) Field of Classification Search
  CPC ..... B29C 73/166; B60S 5/046; B29L 2030/00
  See application file for complete search history.

(56) References Cited

U.S. PATENT DOCUMENTS

| 9,873,232 B2 | 1/2018 | Eckhardt et al. |
| 2004/0159365 A1* | 8/2004 | Cowan .................. B29C 73/166 141/38 |
| 2015/0246490 A1* | 9/2015 | Kono .................. F04B 11/0008 417/444 |

FOREIGN PATENT DOCUMENTS

| DE | 29812740 U1 | 10/1998 |
| EP | 2186628 A1 | 5/2010 |
| WO | 2015112267 A1 | 7/2015 |

OTHER PUBLICATIONS

International Search Report dated Dec. 5, 2016 of international application PCT/EP2016/071743 on which this application is based.

* cited by examiner

*Primary Examiner* — P. Macade Nichols
(74) *Attorney, Agent, or Firm* — Gregory Adams; David Cate

(57) ABSTRACT

A device for sealing and inflating motor vehicle tires, wherein the device has, in a housing, a compressor which is driven by a motor, preferably an electric motor, and which serves for generating the sealing or pump pressure, and the device has a connector for a sealant container, a valve and distributor unit for sealant and pressurized gas, and furthermore connecting means such as hoses and lines, and also switching, control and display devices for the operation of the device, wherein the device furthermore comprises a manually actuatable pressure discharge valve for decreasing the tire pressure, wherein the pressure discharge valve is configured such that, when the sealant container is connected and/or during the delivery of sealant from the sealant container into the tire, an actuation, or a dissipation of the pressure, is prevented.

15 Claims, 3 Drawing Sheets

To the tire

From the compressor

To the tire

APPARATUS FOR SEALING AND INFLATING MOTOR VEHICLE TIRES

CROSS REFERENCE TO RELATED APPLICATIONS

This application is a continuation application of international patent application PCT/EP2016/071743, filed Sep. 15, 2016, designating the United States and claiming priority from German application 10 2015 224 147.5, filed Dec. 3, 2015, and the entire content of both applications is incorporated herein by reference.

FIELD OF THE INVENTION

The invention relates to a device or apparatus for sealing and inflating motor vehicle tires, a so-called breakdown kit, wherein the device has, in a housing, a compressor which is driven by a motor, preferably an electric motor, and which serves for generating the sealing or pump pressure, and the device has a connector for a sealant container, a valve and distributor unit for sealant and pressurized gas, and furthermore connecting means such as hoses and lines, and also switching, control and display devices for the operation of the device, wherein the device furthermore includes a manually actuatable pressure discharge valve for decreasing the tire pressure.

BACKGROUND OF THE INVENTION

In the case of tire-related breakdowns, there is generally the problem that—as has hitherto been conventional for example in a passenger motor vehicle—a filled spare tire mounted on a wheel rim must be carried on board, which spare tire is then fitted in place of the wheel with the defective tire, following which the defective tire must be fastened in the stowage space provided in the vehicle for the spare tire and later taken for repair. For this purpose, it is not only often necessary to unload a laden vehicle in order to access the corresponding stowage space, but it is also necessary for the vehicle itself to be raised using vehicle jacks, and for cumbersome repair work to be performed.

To avoid these disadvantages, repair sets or breakdown kits are already known which include a compressor, a sealant which coagulates in the tire, normally a latex milk mixture, the corresponding connecting hoses and the required cable connections for the supply of energy, and also a switch, manometer and operating element, and which thus provide a permanently usable and complete repair set, with which it is possible to dispense with carrying on board a spare wheel fitted on a wheel rim, or with the constant inspection of other repair materials such as hoses, various tool wrenches, vehicle jacks, et cetera.

Accordingly, DE 29812740 U1 discloses a repair set with a portable container for accommodating on-board tools and working appliances for vehicles, in particular for accommodating a compressor, tools, working appliances and accessories for repairing tires, wherein the container is in the form of a luggage case and contains multiple compartments for the accessories and switching, control and display devices.

The operation of such repair sets is however not entirely simple, in particular if, depending on the operating state, it is firstly necessary for a sealant container and various hose connections to be attached or refitted. Specifically, most repair sets are also very highly suitable for being used, without a sealant insert, merely for inflating tires, inflatable boats, air mattresses et cetera. Owing to the fact that tire-related breakdowns nowadays occur only rarely, the repair sets are generally used more frequently for such leisure purposes than for emergencies. If this however does occur, the user is in an unfamiliar and unpractised situation.

To facilitate the handling of the appliances/repair sets in such different usage situations, solutions are already known in the prior art which substantially involve a simplified switchover from one to the other operation type. Solutions also exist which have plug-type connections between individual parts of the appliances/repair sets.

Aside from this actual object of sealing a damaged tire, the described air compressors are self-evidently frequently also used for inspecting and possibly adapting the tire pressure in a non-damaged tire. In this operating state, it is normally the case that no sealant bottle is connected to the connection piece of the air compressor, and the connector provided for this purpose is closed off in air-tight fashion, often via a cap. Accordingly, by connecting the air compressor to the vehicle tire, the end user can read off the air pressure thereof on a manometer that is normally integrated into the air compressor, and can if necessary increase the air pressure in the tire by activating the air compressor.

This all has the effect that, not only in the event of tire repairs but also in the other applications mentioned, in practical use, a function of lowering the tire pressure is self-evidently also necessary in addition to the increasing of the pressure/tire pressure. Normally, for this purpose, a discharge valve that can be actuated by the user is integrated into the air compressor or into the feed line to the tire.

Here, in the prior art, it is customary for a discharge valve to be permanently installed into the line system, such that the discharge valve can be manually operated by the user in all operating states of the air compressor. Since sealant is however also delivered through the line system when sealing tire damage, inadvertent opening of the discharge valve, or opening of the discharge valve performed with unawareness, in this operating state can result in sealant emerging into the surroundings at high pressure.

Aside from the possible contamination of articles of clothing and the surroundings, irreparable damage to the compressor may also occur depending on the present structural arrangement of the discharge valve. Such incorrect operation by the user is not as unlikely as one might presume, because a typical average user tends to be unfamiliar with handling the air compressor to be used, and is additionally distracted by increased stress when performing sealing in the event of a tire-based breakdown.

SUMMARY OF THE INVENTION

It is an object of the invention to provide a device for sealing and inflating tires, having a discharge valve, in the case of which device an inadvertent opening of the discharge valve is prevented, and which device is therefore safe to handle, has a robust configuration, and at the same time is simple and inexpensive to produce.

This object can, for example, be achieved by an apparatus for sealing and inflating motor vehicle tires. The apparatus includes: a housing; a compressor disposed in the housing; a motor configured to drive the compressor; the compressor being configured to generate a pump pressure; a connector for a sealant container; a valve and distributor unit for sealant and pressurized gas; a plurality of connectors; a switching device; a control device; a display device; a manually actuatable pressure discharge valve for decreasing the tire pressure; and, the manually actuatable pressure discharge valve being configured such that, when the sealant container is connected and/or during delivery of sealant from the sealant container into the tire, an actuation of the manually actuatable pressure discharge valve is prevented.

Here, the pressure discharge valve is configured such that, when a sealant container is connected and/or during the delivery of sealant from the container into the tire, an actuation, or a dissipation of the pressure, is prevented. Incorrect operation is thus reliably prevented, and the user therefore does not run the risk of contaminating his or her articles of clothing or the surroundings or damaging the compressor.

An advantageous embodiment consists in that the pressure discharge valve is arranged in a cover or a covering cap of the connector for the sealant container, and the sealant container is connectable only after the removal of the cover or of the covering cap. Without removing the covering cap, the operation of the breakdown kit with sealant is not possible. With the removal of the covering cap, however, the pressure discharge valve is at the same time also no longer present, such that incorrect operation is thus no longer possible.

A further advantageous embodiment consists in that the pressure discharge valve is mechanically blocked when the sealant container is connected. A mechanical blockage may be realized for example in that, as a result of the sealant container being inserted or screwed in, certain movement capabilities of the discharge valve are restricted or prevented, such that an actuation is no longer possible.

A further advantageous embodiment consists in that the pressure discharge valve is electrically or electromechanically blocked when the sealant container is connected. Accordingly, it is for example possible for electrical contacts to be closed as a result of the sealant container being screwed in, as a result of which, in turn, electromagnetic blocking devices are actuated, which render a triggering of the discharge valve impossible.

BRIEF DESCRIPTION OF THE DRAWINGS

The invention will now be described with reference to the drawings wherein.

DESCRIPTION OF THE PREFERRED
EMBODIMENTS OF THE INVENTION

FIGS. 1A to 1D and 2, viewed together, show a device 1 according to an embodiment of the invention for sealing and inflating motor vehicle tires, in the case of which the pressure discharge valve is arranged in a cover or a covering cap of the connector for the sealant container, and the sealant container can be connected only after removal of the cover or of the covering cap.

Figure 1A:
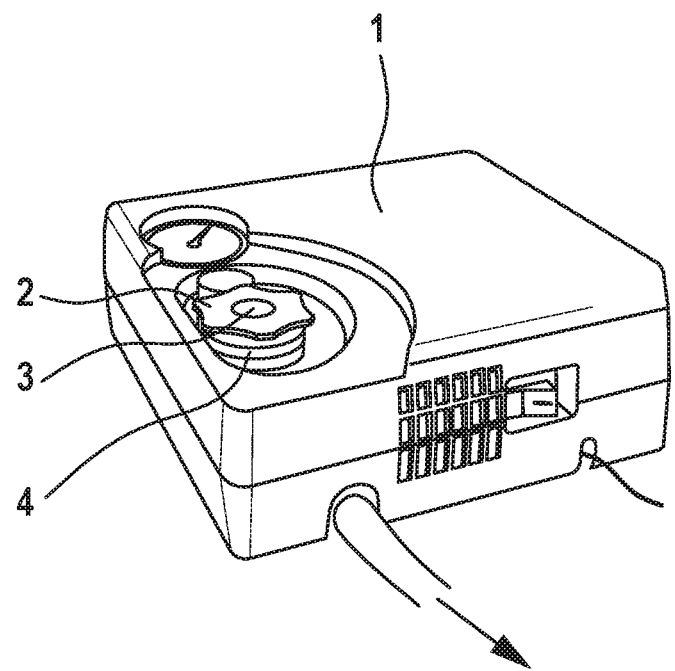
FIGS. 1A to 1D show a device according to the invention.

In the present embodiment, an air discharge valve 3 is integrated into the covering cap 2 of the sealant connector of the connector and distributor unit 4. Without a sealant container 5 connected, the air discharge valve 3 can thus be operated without problems by the end user (FIG. 1A). In the present configuration, the valve 3 is positioned, so as to be clearly visible, adjacent to the manometer integrated in the device.

Figure 1B:
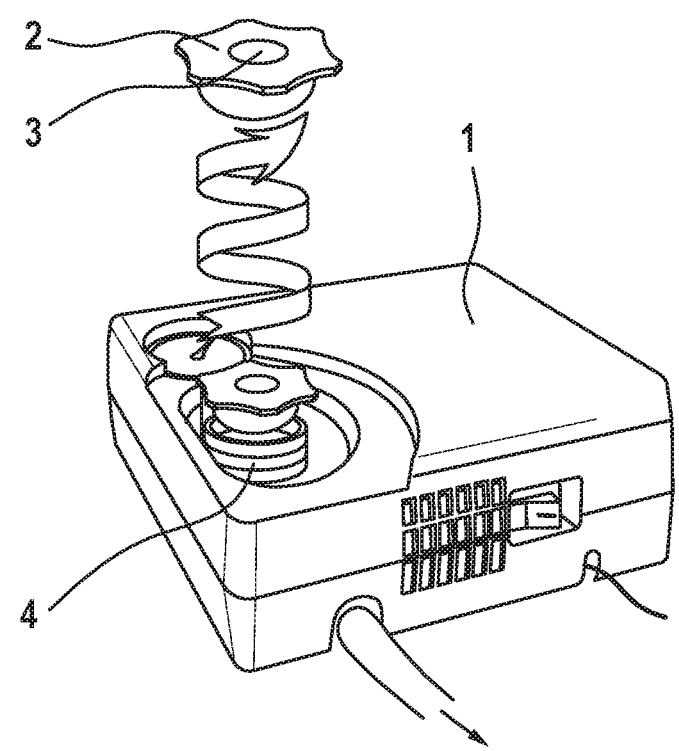

If it is sought to perform sealing in the event of a tire-related breakdown, a sealant container 5 must be connected to the connector and distributor unit 4 of the device 1. For this purpose, firstly, the closure cap 2 is removed from the connector and distributor unit 4 (FIG. 1B). Here, the air discharge valve 3 is also mechanically separated from the device.

Figure 1C:
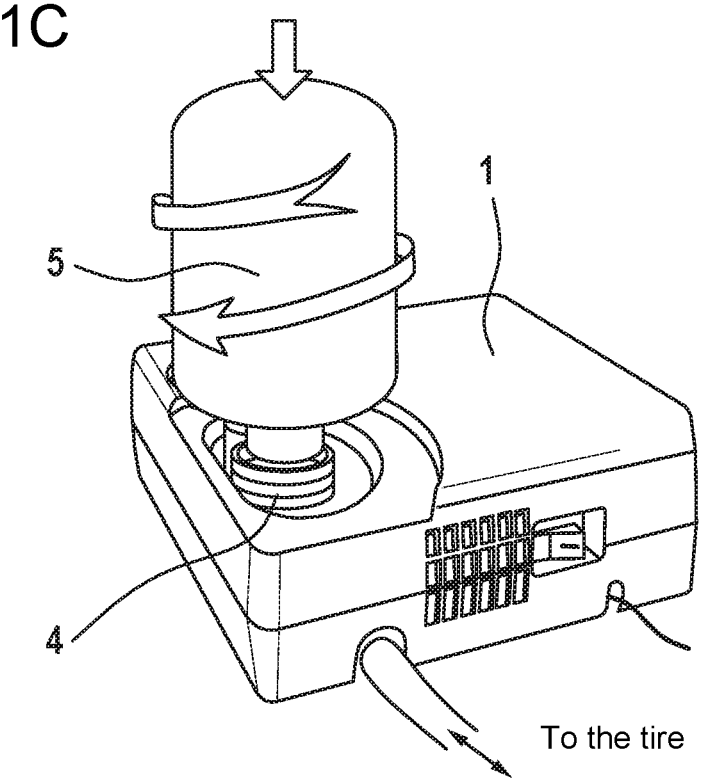
Figure 1D:
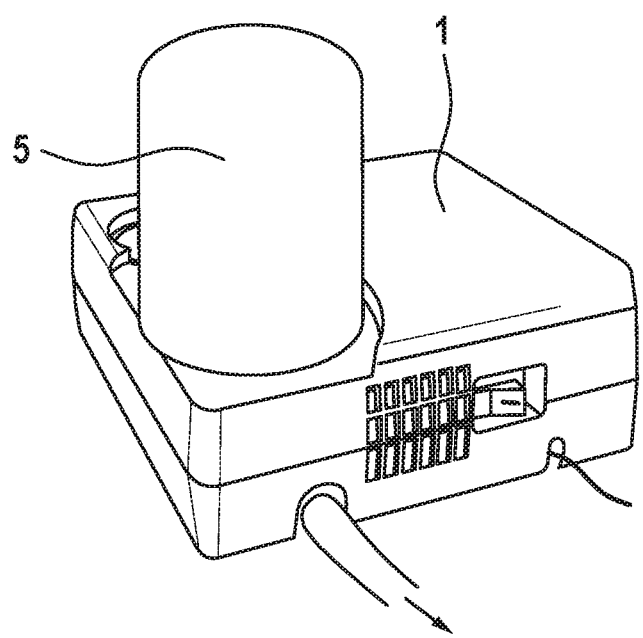

In the next step, the sealant container 5 is connected to the connector and distributor unit 4 (FIG. 1C). The system is then ready for sealing the damaged tire (FIG. 1D). During the delivery of sealant, no sealant can escape, because the air discharge valve has been removed with the closure cap. After successful sealing of the damaged tire, the connector and distributor unit 4 together with the sealant container 5 is removed from the device 1 and is exchanged for a corresponding replacement part.

Figure 2:
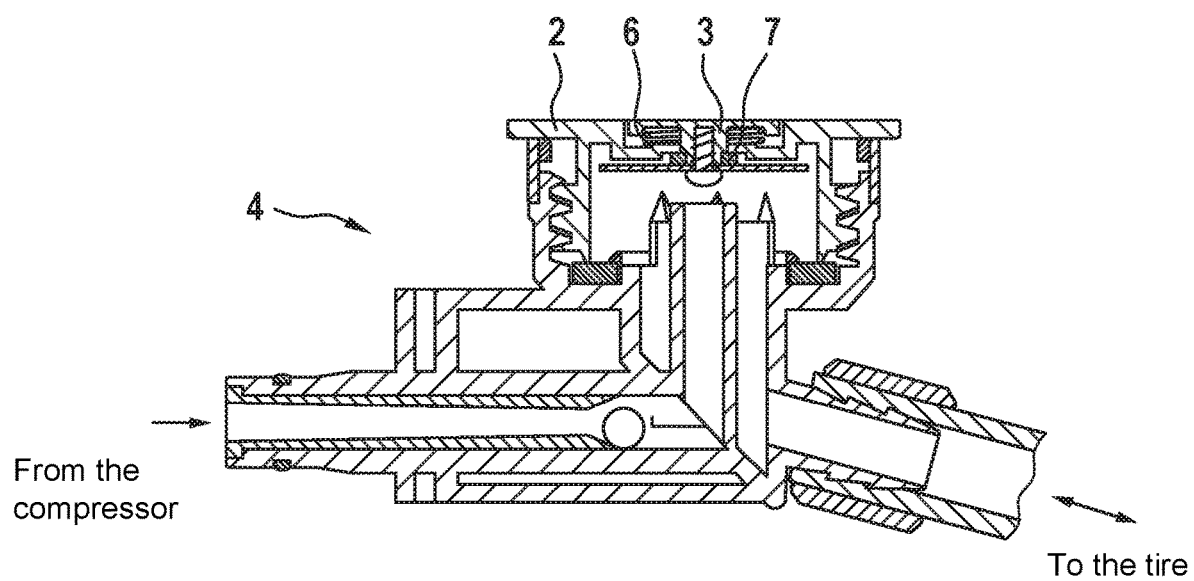
FIG. 2 shows the construction of the connector and distributor unit of a device as per FIGS. 1A to 1D with the discharge valve in detail.

FIG. 2 shows the detailed construction of the connector and distributor unit 4 with discharge valve 3 and with the screwed-in closure cap 2. By exerting pressure on the air discharge valve 3, the spring 6 is compressed, and the seal 7 is lifted off from its seat. As a result of the corresponding opening, air can now flow out of the connected tire into the surroundings for as long as the pressure on the air discharge valve 3 is maintained.

It is understood that the foregoing description is that of the preferred embodiments of the invention and that various changes and modifications may be made thereto without departing from the spirit and scope of the invention as defined in the appended claims.

LIST OF REFERENCE DESIGNATIONS

Part of the Specification

1 Device/breakdown kit
2 Covering cap
3 Air discharge valve
4 Connector and distributor unit/valve and distributor unit
5 Sealant container
6 Valve spring of the air discharge valve
7 Seal of the air discharge valve

What is claimed is:

1. An apparatus for sealing and inflating motor vehicle tires, the apparatus comprising:
    a housing;
    a compressor disposed in said housing;
    a motor configured to drive said compressor;
    said compressor being configured to generate a pump pressure;
    a connector for a sealant container;
    a valve and distributor unit for sealant and pressurized gas;
    a plurality of connectors;
    a switching device;
    a control device;
    a display device;
    a manually actuatable pressure discharge valve for decreasing the tire pressure;
    said manually actuatable pressure discharge valve being configured such that, when the sealant container is connected and/or during delivery of sealant from the sealant container into the tire, an actuation of said manually actuatable pressure discharge valve is prevented; and
    wherein said manually actuatable pressure discharge valve is mechanically blocked when the sealant container is connected.

2. The apparatus of claim 1, wherein said motor is an electric motor.

3. The apparatus of claim 1, wherein said connector is a hose.

4. The apparatus of claim 1, wherein said connector is a line.

5. The apparatus of claim 1, wherein said manually actuatable pressure discharge valve is configured such that, when the sealant container is connected and/or during delivery of sealant from the sealant container into the tire, a dissipation of the 5 pressure is prevented.

6. The apparatus of claim 1, wherein said pump pressure is a sealing pressure.

7. An apparatus for sealing and inflating motor vehicle tires, the apparatus comprising:
- a housing;
- a compressor disposed in said housing;
- a motor configured to drive said compressor;
- said compressor being configured to generate a pump pressure;
- a connector for a sealant container;
- a valve and distributor unit for sealant and pressurized gas;
- a plurality of connectors;
- a switching device;
- a control device;
- a display device;
- a manually actuatable pressure discharge valve for decreasing the tire pressure;
- said manually actuatable pressure discharge valve being configured such that, when the sealant container is connected and/or during delivery of sealant from the sealant container into the tire, an actuation of said manually actuatable pressure discharge valve is prevented; and
- wherein said manually actuatable pressure discharge valve is arranged in a cover or a covering cap of the connector for the sealant container; and, the sealant container is connectable only after the removal of the cover or of the covering cap.

8. The apparatus of claim 7, wherein said motor is an electric motor.

9. The apparatus of claim 8, wherein said connector is a hose.

10. The apparatus of claim 8, wherein said connector is a line.

11. An apparatus for sealing and inflating motor vehicle tires, the apparatus comprising:
- a housing;
- a compressor disposed in said housing;
- a motor configured to drive said compressor;
- said compressor being configured to generate a pump pressure;
- a connector for a sealant container;
- a valve and distributor unit for sealant and pressurized gas;
- a plurality of connectors;
- a switching device;
- a control device;
- a display device;
- a manually actuatable pressure discharge valve for decreasing the tire pressure;
- said manually actuatable pressure discharge valve being configured such that, when the sealant container is connected and/or during delivery of sealant from the sealant container into the tire, an actuation of said manually actuatable pressure discharge valve is prevented; and
- wherein said manually actuatable pressure discharge valve is electrically or electromechanically blocked when the sealant container is connected.

12. The apparatus of claim 11, wherein said motor is an electric motor.

13. The apparatus of claim 11, wherein said connector is a hose.

14. The apparatus of claim 12, wherein said connector is a line.

15. The apparatus of claim 14, wherein said manually actuatable pressure discharge valve is configured such that, when the sealant container is connected and/or during delivery of sealant from the sealant container into the tire, a dissipation of the 5 pressure is prevented.

* * * * *